US005686923A

United States Patent [19]

Schaller

[11] Patent Number: 5,686,923

[45] Date of Patent: Nov. 11, 1997

[54] MULTI-BEAM ANTENNA FOR RECEIVING MICROWAVES EMANATING FROM SEVERAL SATELLITES

[75] Inventor: Michel Schaller, Garancieres, France

[73] Assignee: Dasault Electronique, Saint Cloud, France

[21] Appl. No.: 432,644

[22] Filed: May 3, 1995

[30] Foreign Application Priority Data

May 10, 1994 [FR] France .................................. 94 05761

[51] Int. Cl.[6] .............................. H04B 7/185; H01Q 3/22; H01Q 19/10; H01Q 19/12

[52] U.S. Cl. .................. 342/352; 342/368; 343/700 MS; 343/755; 343/840

[58] Field of Search ...................................... 342/368, 375, 342/352; 343/755, 840, 700 MS, 781 R

[56] References Cited

U.S. PATENT DOCUMENTS

| | | | |
|---|---|---|---|
| 3,170,158 | 2/1965 | Rotman | 342/376 |
| 3,267,472 | 8/1966 | Fink | 342/368 |
| 3,881,178 | 4/1975 | Hannan | 343/840 |
| 3,931,624 | 1/1976 | Hundley et al. | 343/840 |
| 3,936,835 | 2/1976 | Phelan | 343/840 |
| 4,965,588 | 10/1990 | Lenormmard et al. | 342/372 |
| 5,019,833 | 5/1991 | Nonaka | 343/840 |
| 5,072,226 | 12/1991 | Chang et al. | 342/351 |
| 5,115,248 | 5/1992 | Roederer | 342/373 |
| 5,202,700 | 4/1993 | Miller | 343/840 |

FOREIGN PATENT DOCUMENTS 9207394 4/1992 WIPO .

*Primary Examiner*—Gregory C. Issing
*Attorney, Agent, or Firm*—Dennison, Meserole, Pollack & Scheiner

[57] ABSTRACT

A multi-beam antenna for receiving microwaves emanating from at least first and second satellites comprising: a reflector which has a cylindro-paraboloidal shape (2) arranged substantially in the vertical plane and capable of focusing the incident microwaves on a substantially horizontal focal straight line (D) constructed from the foci (F1 to F5) of the reflector, at least first and second linear networks (R1, R2) being distributed substantially horizontally in the focal plane of the reflector, in order to receive and process, according to first and second laws of amplitude and time-lag, the incident microwaves emanating from first and second directions corresponding to the first and second satellites.

20 Claims, 12 Drawing Sheets

MULTI-BEAM ANTENNA FOR RECEIVING MICROWAVES EMANATING FROM SEVERAL SATELLITES

BACKGROUND OF THE INVENTION

The invention relates to the reception of microwaves emanating from several satellites.

At present, numerous satellites are used for the transfer of information of the television programme or radio broadcasting type.

Such satellites are generally situated on a single geostationary orbit approximately 36,000 km high, substantially directly above the equator.

The success of information transfer by satellites can be explained partly by the relative immobility of the satellite which promotes radioelectric emission, on the one hand, and by the use of fixed wave receivers (antennae) on the other hand.

The antennae used, both on the satellite and on the earth, are generally equipped with paraboloidal reflectors insofar as the frequency used by the link (from 4 to 12 GHz) is high and also as a result of the perfect compatibility of the angular aperture of the directionality diagrams with the earth surfaces to be covered. At that distance of 36,000 km, one degree of angle ensures a projection of approximately 630 km, which accords fairly well with the zones to be covered.

In general, a satellite transmits one or more predetermined programmes.

If the user wishes to broaden the spectrum of information received it is necessary to pick up several satellites.

A known solution for receiving several satellites consists in using several paraboloidal mirrors, each of which is set to a respective satellite. Nevertheless, such a solution is restrictive from the point of view of space requirement and the cost of installation.

Another known solution consists in using a motorised paraboloidal mirror capable of turning and of positioning itself on a selected satellite on command. However, such a solution is expensive, especially because of the motorisation of the antenna.

Also known are antennae having paraboloidal reflectors which are equipped with two heads (sources) for picking up two satellites with the same antenna. Such antennae are not entirely satisfactory inasmuch as they permit the picking up of a maximum of two orbitally very close satellites and have impaired performance, especially as a result of the displacement of the second head in relation to the focus of the paraboloidal mirror.

OBJECT OF THE INVENTION

An aim of the invention is therefore to provide a multi-beam antenna for receiving several satellites which does not have the disadvantages of the previous solutions.

According to the invention, that aim is achieved by means of an antenna which is characterised in that it comprises:

a reflector which has a cylindro-paraboloidal shape and is arranged substantially in the vertical plane and is capable of focusing the incident microwaves on a substantially horizontal focal straight line constructed from the foci of the reflector;

at least first and second linear networks of receiving elements, the said linear networks being distributed substantially horizontally in the focal plane of the reflector, in order to receive and process, according to first and second laws of amplitude and time-lag, the incident microwaves emanating from first and second directions corresponding to first and second satellites.

Advantageously, the reflector is substantially inclined in the vertical plane in order to offset the first and second linear networks in relation to the centre of the reflector.

Such an eccentric arrangement of the linear networks avoids the masking effect resulting from the intersection of the incident microwaves by the linear networks.

Preferably, the first and second laws of amplitude are set up in such a manner as to avoid reception interference between the first and second satellites.

In practice, the first and second laws of amplitude are of the CHEBYSHEV type.

Advantageously, the linear networks are produced by printed technology.

According to an important feature of the invention, each linear network has a respective radiation diagram, of which the angular aperture at half-power is, in terms of elevation angle, of the order of ±30° and, in terms of bearing, of the order of 1.2°.

In printed technology, each linear network comprises:

a first focusing radiating layer adapted for focusing the incident microwaves, comprising a plurality of focusing radiating elements arranged in a line;

a second pass-band spreading radiating layer comprising a plurality of band spreading radiating elements arranged in a line opposite the focusing elements;

a third reference radiating layer comprising a linear network of reference radiating elements arranged in a line opposite the band spreading radiating elements and coupled to the latter for the reception of a given satellite; and a fourth layer for processing the signals so received.

Advantageously, the antenna comprises a carrying structure of the cradle type capable of carrying the first and second linear networks.

Advantageously, the carrying structure also supports the reflector.

In practice, the length of the reflector is of the order of from 1.80 to 2.50 m and the height of the reflector is of the order of 1.10 m.

In practice, the length and the height of the first and second linear networks are of the order of 1.50 m and 20 mm, respectively.

Very advantageously, the linear networks are capable of being installed on the antenna in an open-ended manner, the latter functioning equally well regardless of the number of networks.

In practice, the angular dynamics of a source made up of a plurality of linear networks mounted on the cradle are, in terms of bearing, of the order of ±40° and, in terms of elevation angle, of the order of ±5°.

The invention also relates to a method of installing a multi-beam antenna of the type mentioned above at a given site.

According to an important feature of the invention, the method comprises the following stages:

a) providing a set of several linear networks, each having a radiation diagram of predetermined bearing;

b) collecting first-level information relating to the latitude and longitude of the site, according to the number of satellites to be received, at the minimum angle of phase difference between the selected satellites, and at the maximum angular dynamics corresponding to the selected satellites;

c) calculating second-level information relating to the nominal course and elevation positioning of the antenna from the first-level information thus collected;

d) orienting the course and elevation of the reflector of the antenna on the basis of the second-level information thus calculated;

e) selecting from the set of linear networks that of which the radiation diagram is adapted to that of the selected satellites as a function of the first-level information thus collected;

f) installing the linear networks so selected on the support substantially at the level of the focal straight line, in accordance with an order determined as a function of the first-level information thus collected.

Other features and advantages of the invention will become apparent in the light of the following detailed description and the attached drawings.

DETAILED DESCRIPTION OF THE PREFERRED EMBODIMENT

Figure 1:
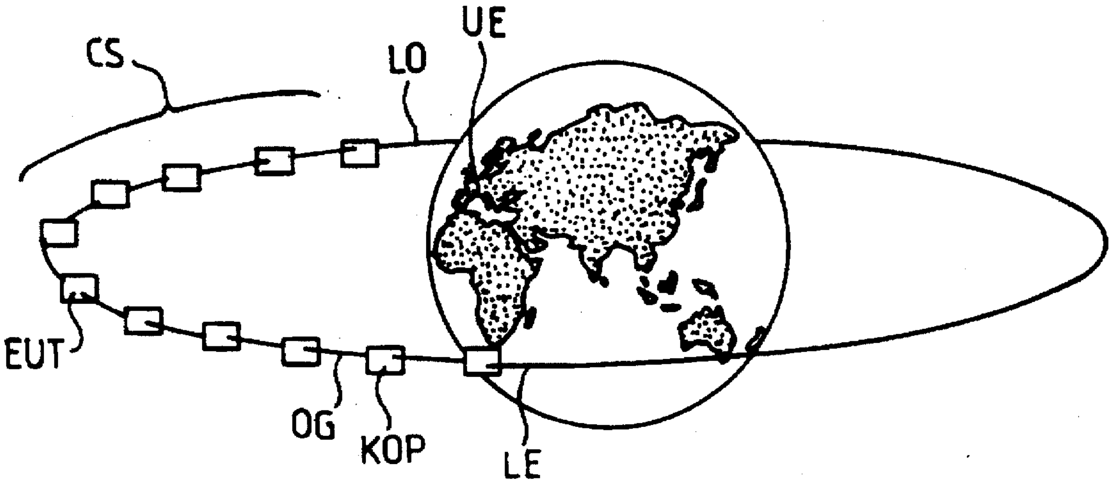
FIG. 1 is a diagrammatic representation of the geostationary orbit of the satellites.

In FIG. 1, the geostationary orbit OG facing Europe UE comprises a constellation of satellites CS which extends from approximately 30° longitude east (LE) to 30° longitude west (LO). The satellites are spaced apart from one another by a few degrees. The following satellites in particular can be seen: KOPERNIKUS 1 (28.5° longitude east, KOP) EUTELSAT 1 F4 (7° longitude east, EUT), etc.

Figure 2:
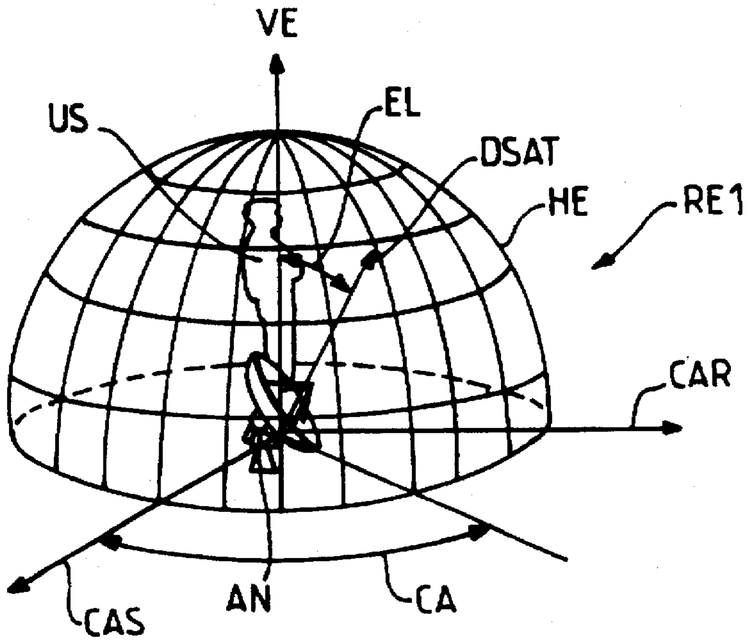
FIG. 2 is a diagrammatic representation of the reference frame having spherical course and elevation coordinates.

In FIG. 2, the reference RE1 denotes a reference frame of spherical coordinates articulated about a hemisphere HE. The origin of that reference frame is a user US of an orientable paraboloidal antenna AN. The reference frame has three orthogonal axes; the first is that of the perpendicular of the site VE, the second is that defined by course south CAS generally selected as reference at 180° and the third CAR is that which defines the plane of the horizon with course south CAS. The user US points the paraboloidal antenna AN in the direction towards the satellite. He selects an elevation EL defined by the angle between the perpendicular of the site VE and the direction towards the satellite DSAT above the line of the horizon and a course CA defined in the plane of the horizon.

The constellation of the satellites moves in relation to the reference frame RE1 as a function of the site of observation on the earth (latitude and longitude).

Figure 3:
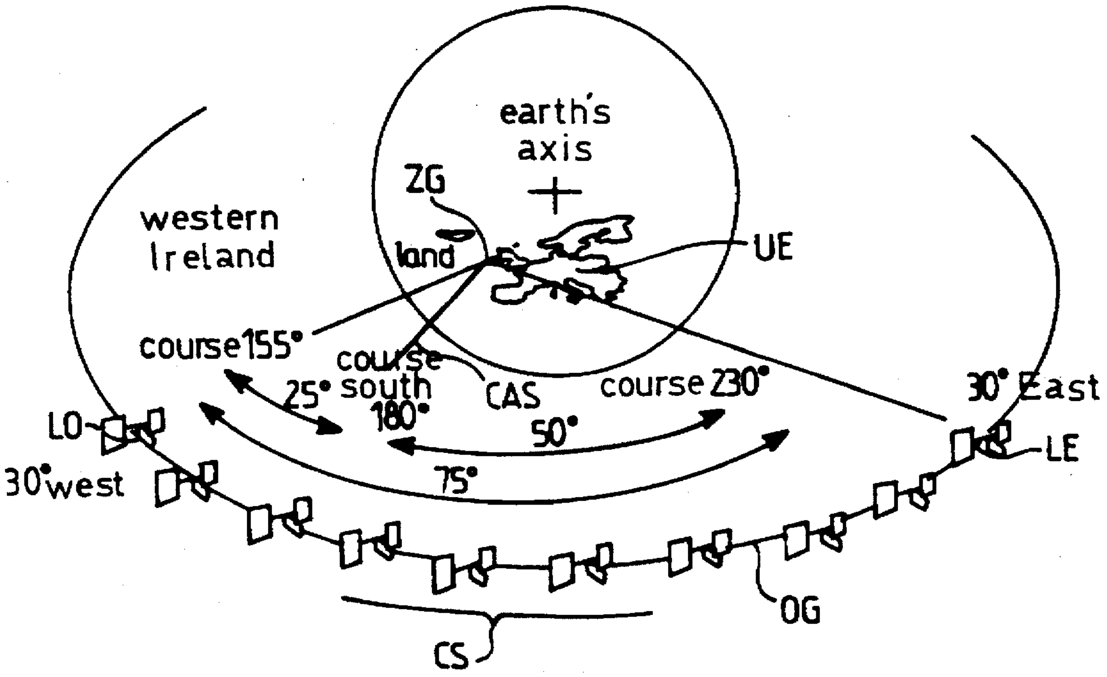
FIG. 3 is a diagrammatic representation of the constellation of satellites viewed from a point situated "Western Ireland"

The constellation of the satellites CS in FIG. 3 is that seen by a user placed in the geographical zone ZG called "Western Ireland". Under those conditions, the "angular course dynamics" are 75° (between course 155° and course 230°) if the user wishes to ensure that it is possible to see all the satellites CS (between 30° longitude east LE and 30° longitude west LO).

In the case of a paraboloidal antenna equipped in known manner with a motor, it would be advantageous to effect rotation about the vertical axis of the site ZG from course 155° to course 230°.

According to the invention, the multi-beam antenna which will be described in more detail hereinafter advantageously uses a reference frame other than that described with reference to FIG. 2.

Figure 4:
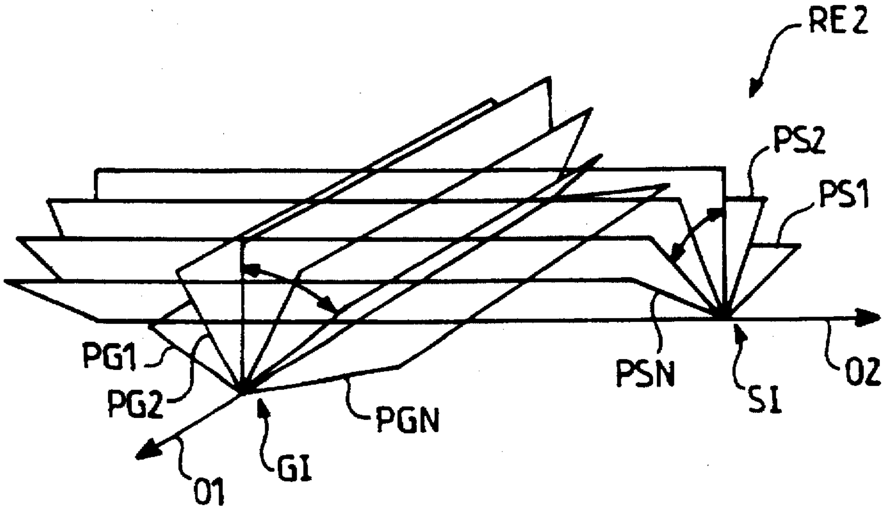
FIG. 4 is a diagrammatic representation of the elevation angle/bearing reference frame.

In FIG. 4, the reference frame RE2 is an "elevation angle/bearing" reference frame often used in electronic sweeping. It is a cartesian angular grid generated from two groups of planes PS1 to PSN and PG1 to PGN concurrent at two orthogonal axes 01 and 02.

Figure 5:
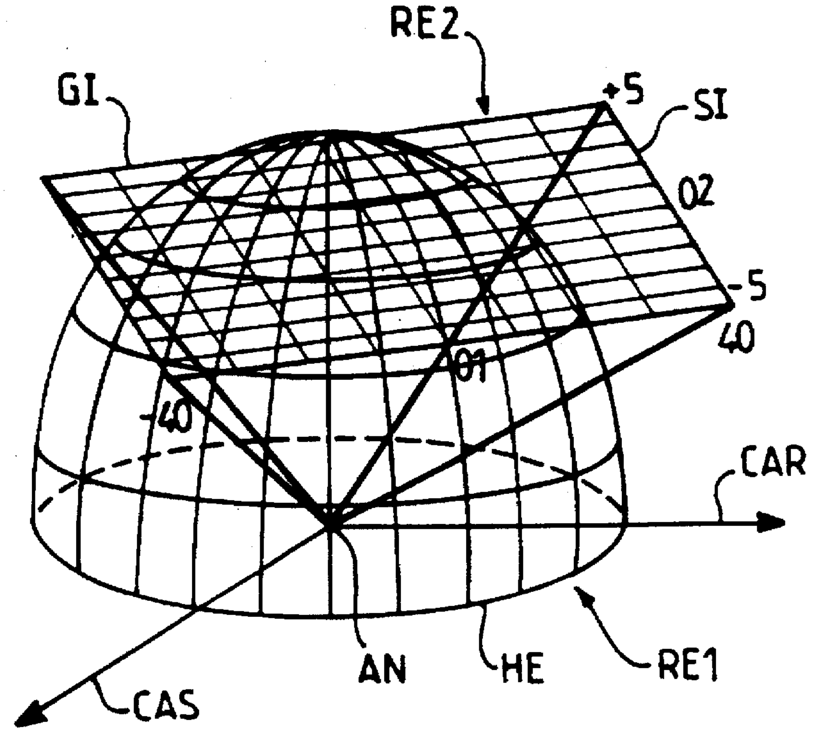
FIG. 5 is a diagrammatic representation of the superimposition of the spherical coordinate and elevation angle/bearing reference frames according to the invention.

In FIG. 5, the reference frames RE1 and RE2 are superimposed. For example, the elevation angle SI has a value which varies between ±5° and the bearing GI has a value which varies between ±40°. The axis 01 corresponds to a 0° bearing and the axis 02 corresponds to a 0° elevation angle.

Figure 6:
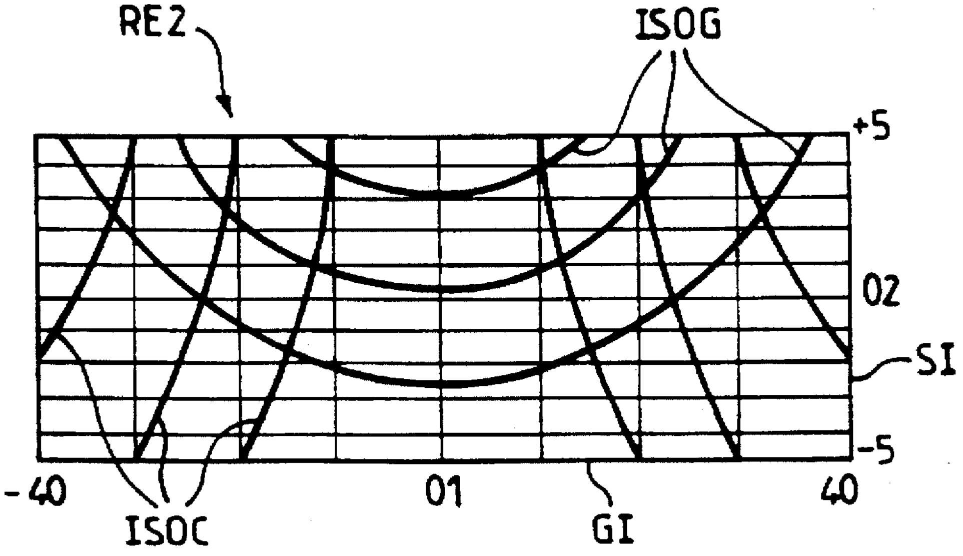
FIG. 6 is an alignment chart resulting from the superimposition of the spherical coordinate and elevation angle/bearing reference frames according to the invention.

In FIG. 6, the superimposition of the reference frames produces an alignment chart. The superimposition of the reference frames defines iso-course lines ISOC and iso-bearing lines ISOG. Mathematical formulae enable the indicator to be changed between the spherical reference frame RE1 and the elevation angle/bearing reference frame RE2. These known formulae are of the trigonometric type.

Surprisingly, the Applicant has observed that the changing of the reference frames constitutes a valuable and efficient aid in the positioning of a multi-beam antenna and the choice of linear networks which will be described in more detail hereinafter for the reception of several satellites.

Figure 7:
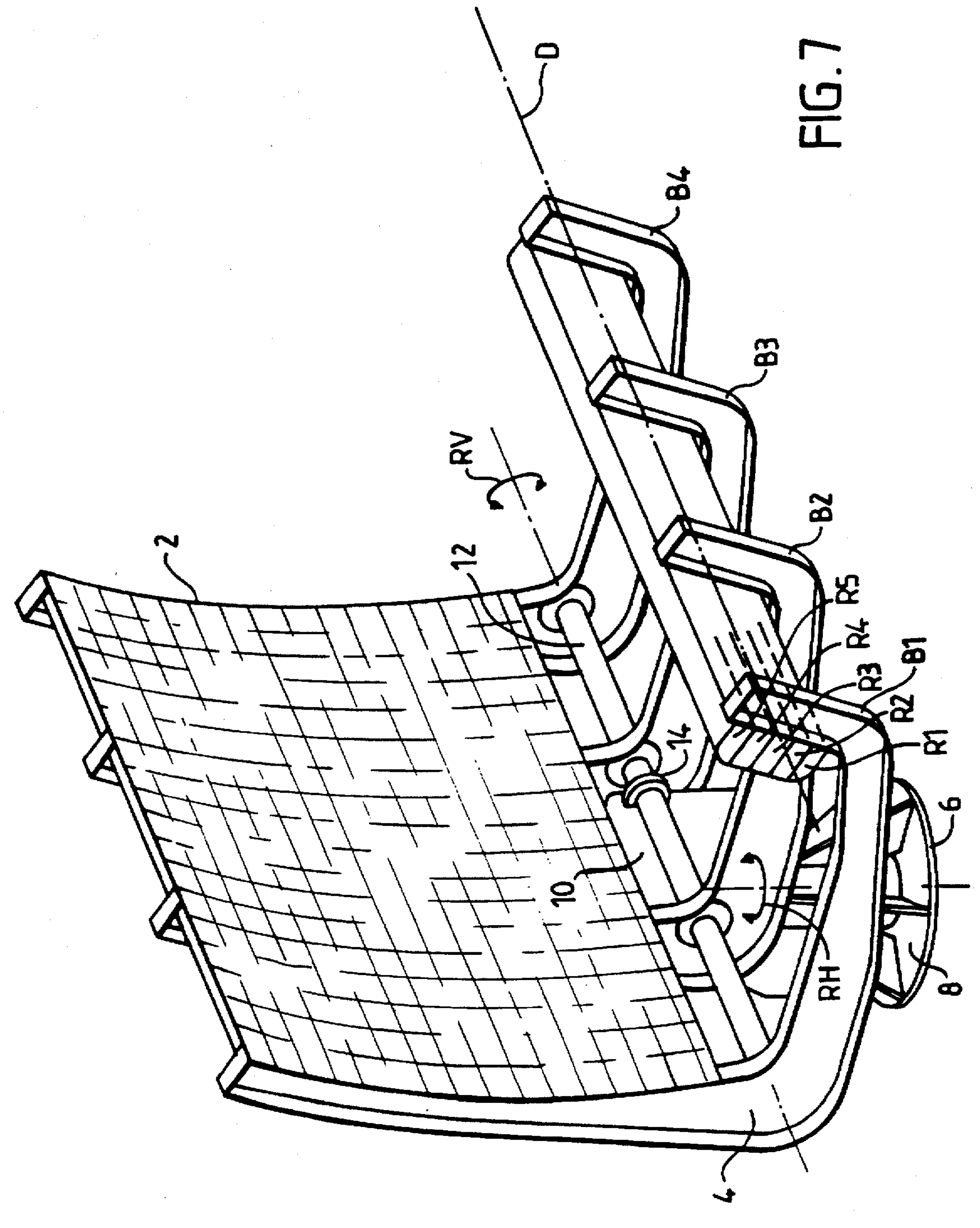
FIG. 7 is a perspective view of a multi-beam antenna according to the invention.

In FIG. 7, the multi-beam antenna according to the invention comprises a cylindro-paraboloidal reflector 2 arranged substantially in the vertical plane. The generators of the cylinder extend substantially in the horizontal plane and the circular cross-section extends substantially in the vertical plane.

The reflector is manufactured from a reflective material of the type: shaped sheet metal, buckled sheet metal with panels, composite material, such as carbon fibre, or mixed material.

The reflector may have a surface which is entirely solid. It may also be open-worked in its peripheral portion so that it will not be caught by the wind to the same degree. Under those conditions, it is, for example, provided with a grid of metallic wire arranged around the solid central portion.

Figure 9:
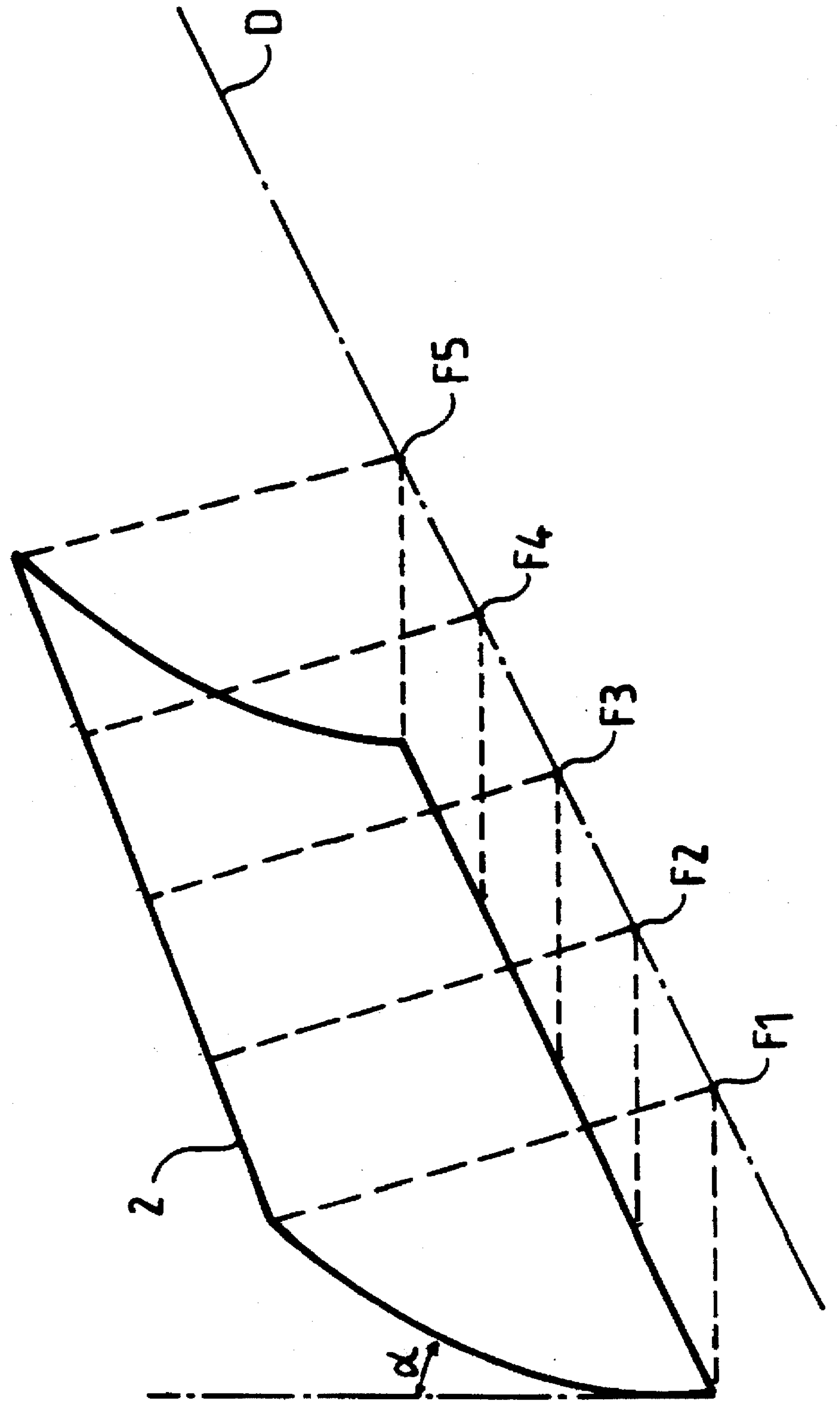
FIG. 9 is a diagrammatic representation of the cylindro-paraboloidal reflector of the antenna according to the invention.

The reflector focuses the incident microwaves on a substantially horizontal focal straight line D constructed from the foci F1 to F5 of the reflector (FIG. 9).

Linear receiving networks R1 to R5 are to be placed at the level of the focal straight line D of the reflector. The networks are substantially adjacent one another and are distributed substantially horizontally in the focal plane of the reflector.

The aim of the linear networks R1 to R5 is to receive and process according to laws of amplitude and time-lag the incident microwaves emanating from different directions corresponding to different satellites.

The reflector 2 is substantially inclined in the vertical plane by an angle of elevation.

In particular, that inclination enables the linear networks to be offset in relation to the centre of the reflector. Such an offset arrangement avoids the masking effect resulting from the intersection of the incident microwaves by the linear networks.

The antenna comprises a carrying structure 4 of the cradle type capable of carrying the linear networks and also the reflector.

The carrying structure 4 comprises a base 6 on which the cradle-type carrier is mounted.

Advantageously, the cradle-type carrier comprises four support arms B1 to B4 in a generally angled shape which are capable of supporting both the reflector 2 and the linear networks R1 to R5.

The base 6 can be fixed in position by means of a screw/bolt assembly 8 on the plane of observation on the earth, for example the terrace roof of an apartment building.

Figure 8:
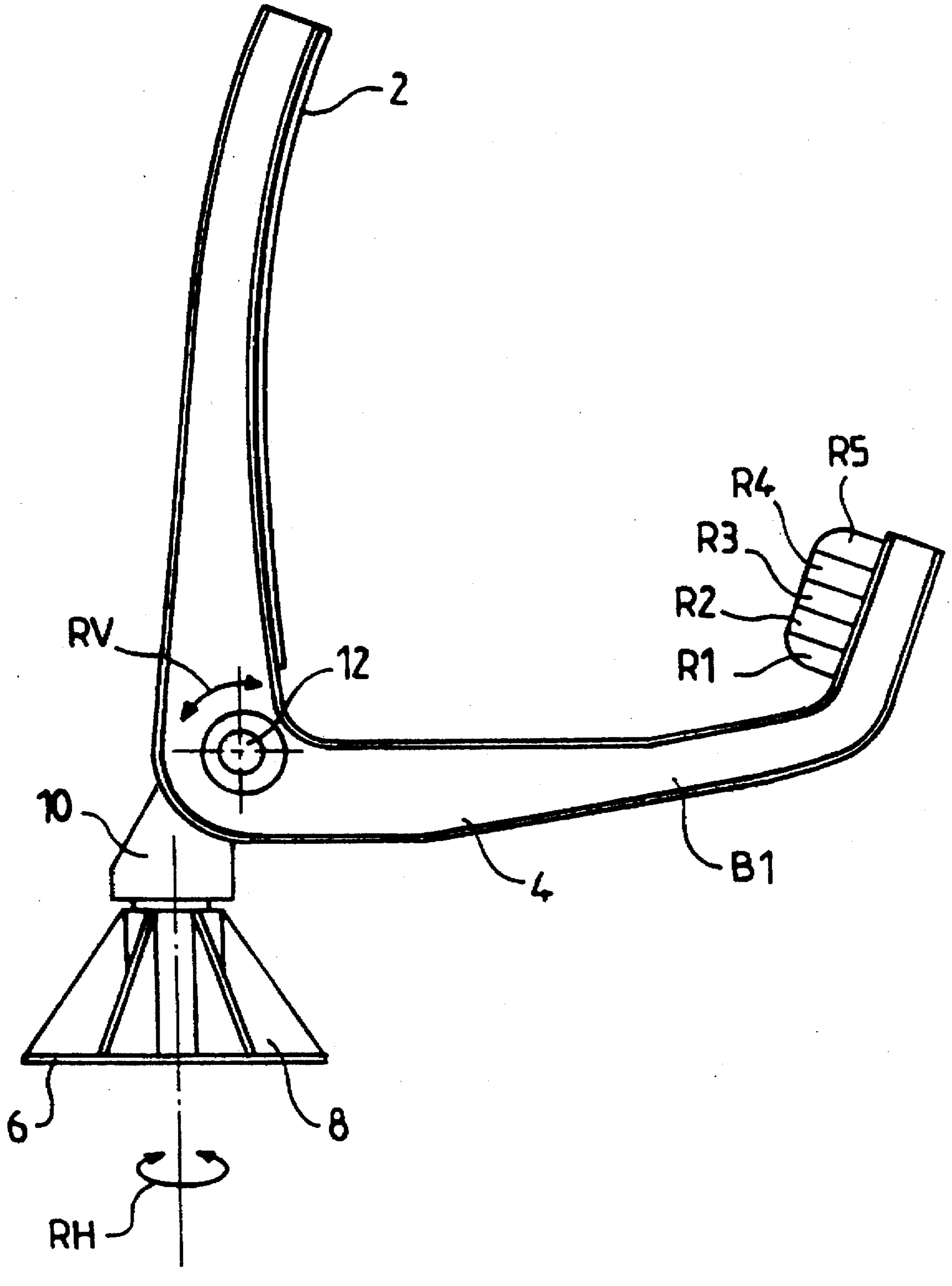
FIG. 8 is a sectional view of the antenna of FIG. 7.

As shown in FIG. 8, an element forming a trunnion 10 is mounted on the base 6. The assembly forming the trunnion is articulated along two axes. First of all, it is mounted to rotate in the horizontal plane RH for the manual positioning of the course of the antenna. Secondly, it is movable in rotation in the vertical plane RV for the manual positioning of the elevation of the antenna.

The four arms B1 to B4 are fixedly joined to one another by a cylindrical longitudinal bar 12 which extends through them at the level of the angled portion of the said arms. The longitudinal bar extends substantially in the horizontal plane.

The longitudinal bar 12 is assembled on the trunnion 10 by means of clamping jaws, staples and screws/bolts (not shown).

The cradle-type carrier is produced, for example, from composite material, such as carbon fibre. Such a cradle-type carrier provides the antenna assembly with a high degree of rigidity and also provides a high degree of precision in the manual positioning of the antenna.

The mounting and dismounting of the linear networks can be carried out by the person installing the antenna.

The assembly of linear networks is advantageously protected by a radome providing a high degree of protection against humidity. It advantageously comprises a de-icing device.

The length of the reflector is of the order of from 1.80 to 2.50 m. Its height is approximately 1.10 m.

The length and the height of the linear networks are of the order of 1.50 m and 20 mm, respectively.

In practice, with the above-mentioned dimensions, the focal distance of the antenna is of the order of 1 m.

It should be pointed out that the above-mentioned dimensions of the antenna are necessary in order to ensure reception conditions suited to the capacity of low-power satellites.

Figure 10:
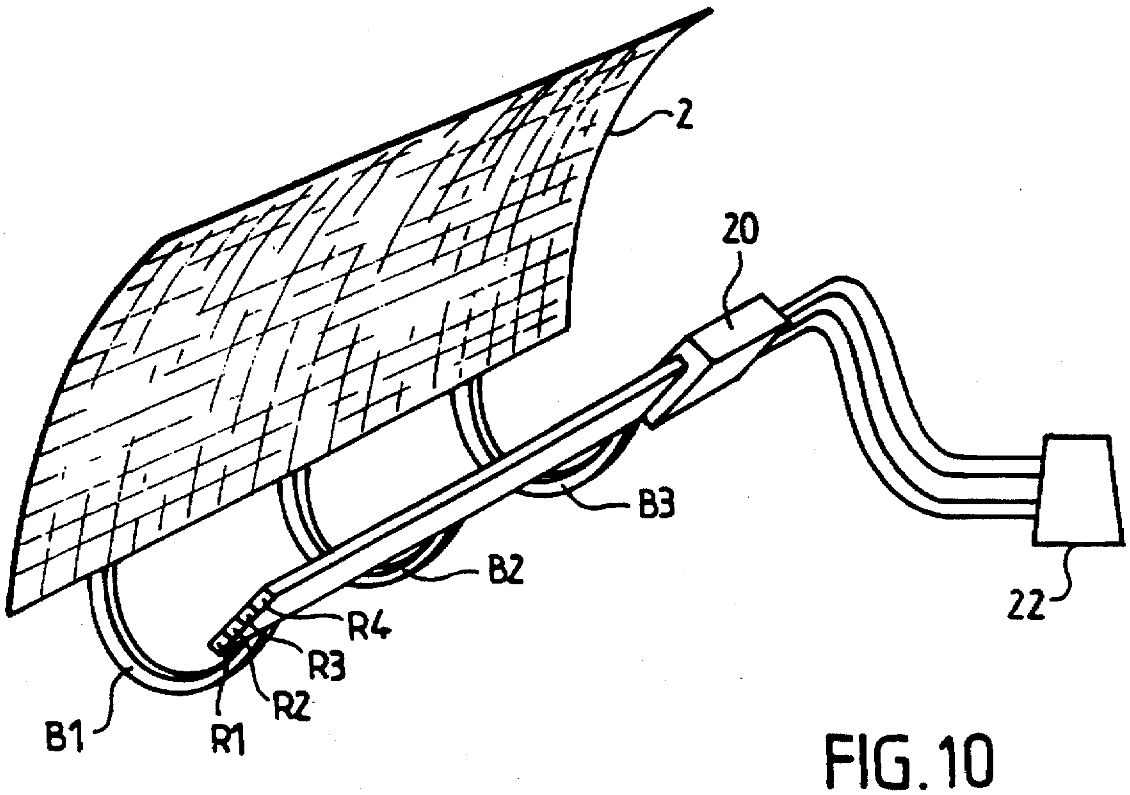
FIG. 10 is a diagrammatic representation of the deviation of the incident beam generated by the focal displacement of the linear networks.

In FIG. 10, in another embodiment of the invention, the antenna is equipped with four linear networks R1 to R4 supported by a cradle having three arms B1, B2, B3.

The networks R1 to R4 are connected to respective frequency transposition modules 20, which are themselves connected by coaxial cables to processing means 22 of the conventional multi-channel reception demodulator type.

Figure 11:
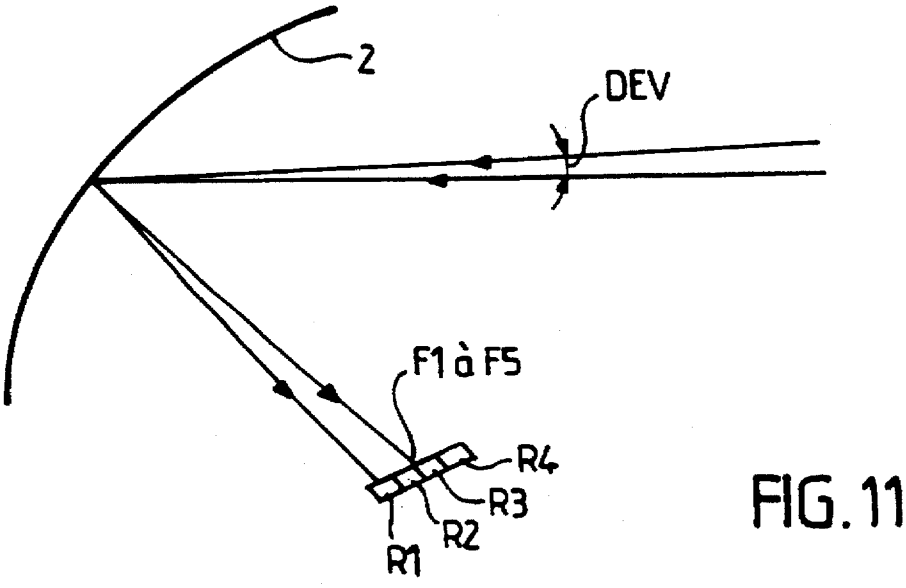
FIG. 11 is a diagrammatic representation of an antenna having four linear networks according to the invention.

As shown in FIG. 11, a deviation effect of the incident beams DEV occurs in elevation in the case of low angular values. This deviation effect develops as a function of the position of the linear networks R1 to R4 in relation to the foci F1 to F5.

For example, with reference to FIG. 7, only the linear network R3 is positioned at the level of the focal straight line D. The others, R1, R2, R4 and R5, are slightly defocused.

Surprisingly, the Applicant has observed that this defocusing, or deviation effect, which results from the mounting in "tiers", or the non-coplanar mounting, of the linear networks can be compensated for according to the invention without appreciably reducing the performance of the antenna.

Figure 12:
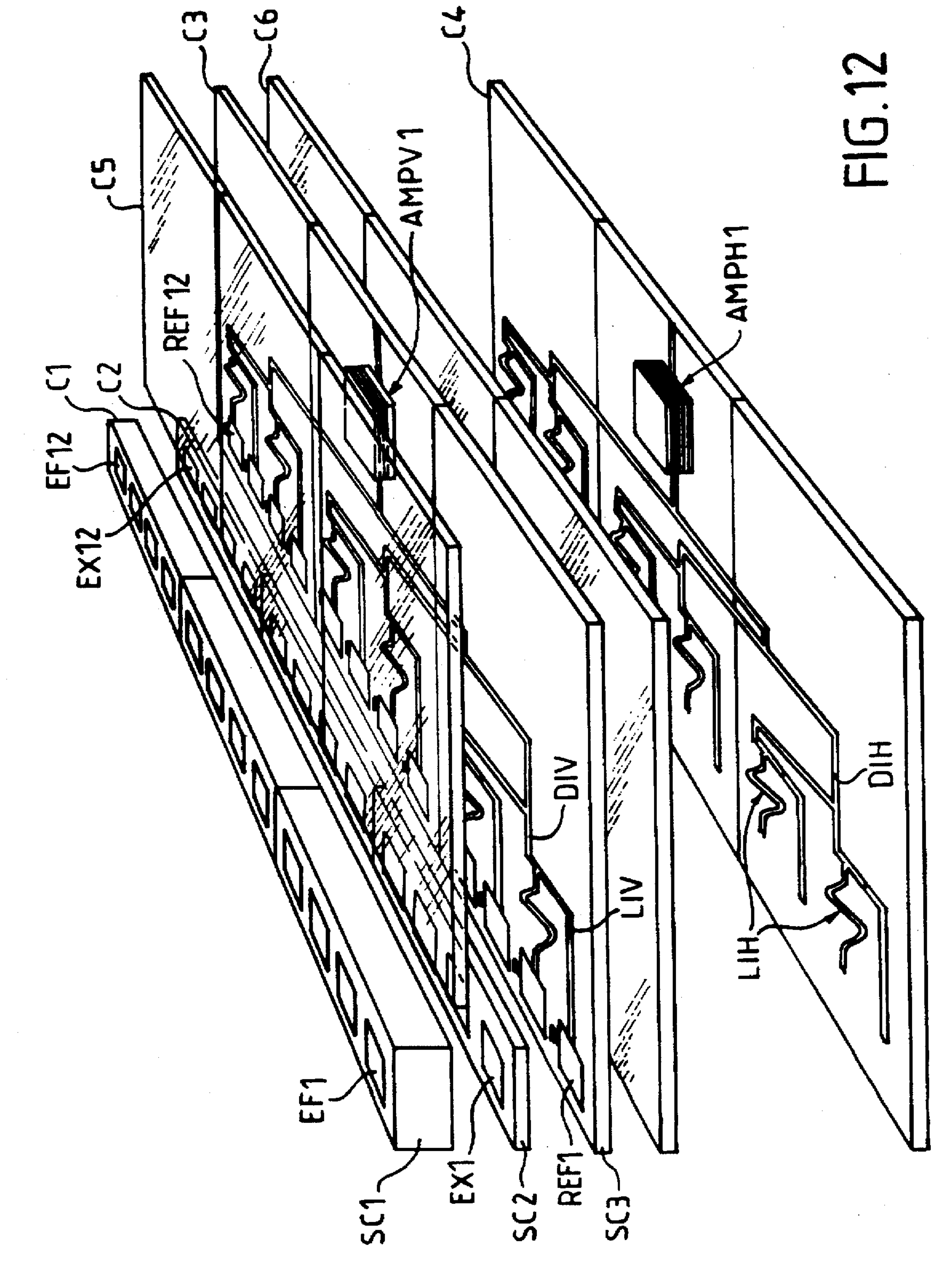
FIG. 12 is an exploded partial perspective diagrammatic representation of a linear sub-network produced by triple-sheet technology according to the invention.

FIG. 12 shows a printed technology embodiment of a radiating linear network according to the invention.

In printed technology, each linear network comprises at least four individual layers C1 to C4.

The first layer C4 is a focusing radiating layer able to focus the incident microwaves. It comprises a linear network of 12 individual radiating elements EF1 to EF12, for example rectangular tiles. These radiating elements are deposited on a substrate SC1 having a thickness of the order of from 3 to 10 mm. The substrate SC1 is formed from a material of the Duroïd (Registered Trade Mark) type or of the foam type having dielectric coefficients of less than 2. The radiating tiles are metallised from Kapton (Registered Trade Mark) film.

The second layer C2 is a band spreading radiating layer. In practice, it comprises a linear network of radiating elements EX1 to EX12 arranged opposite the focusing radiating elements EF1 to EF12. The band spreading elements are implanted on an insulating substrate SC2 which is approximately 3 mm thick and is produced from a foam-type material having dielectric coefficients of less than 2.

The band spreading pick-up elements EX1 to EX12 are, for example, radiating rectangular tiles produced, for example, by conventional microstrip technology.

The third radiating layer C3 comprises a linear network of reference radiating elements REF1 to REF12.

Correspondingly, the reference radiating elements are radiating rectangular tiles. They are also produced by microstrip technology, for example in accordance with triple-sheet technology. In practice, these reference elements are implanted on an insulating substrate SC3 which is approximately 1 mm thick and is produced from a material of the Duroïd 6200 (Registered Trade Mark), epoxy glass or foam type having dielectric coefficients of less than 2. In accordance with triple-sheet technology, the layer C3 is intercalated between an upper transparent layer C5 and a lower transparent layer C6.

The reference radiating elements REF1 to REF12 are advantageously of the bipolarisation type, with adaptation.

Under those conditions, the layer C3 also comprises lines LIV for supplying vertical polarisation which connect the reference tiles to amplification means AMPV1 in accordance with an inverse partially binary treeing which will be described in more detail hereinafter. Equiphase amplitude divisors DIV, for example of the Wilkinson type, are also provided to adapt the distribution of energy. The lines LIV are time-lag lines of selected lengths for synthesising the electrical phase shift necessary for the azimuth course orientation of the beam of the associated network.

Finally, the fourth layer C4 comprises lines LIH for supplying horizontal polarisation which connect the metallised holes TS1 to TS12 of the reference tiles REF1 to REF12 to amplification means AMPH1 in accordance with an inverse binary treeing which will be described in more detail hereinafter. Equiphase amplitude divisors DIH, for example of the Wilkinson type, are also provided to adapt the distribution of energy. The lines LIH are time-lag lines of selected lengths for synthesising the electrical phase shift necessary for the azimuth orientation of the beam of the associated network.

By way of variation, the layers C1 and C2 may form a single focusing and band spreading layer. Equally, the horizontal and vertical polarisation lines may all be arranged on the layer C3.

Figure 13:
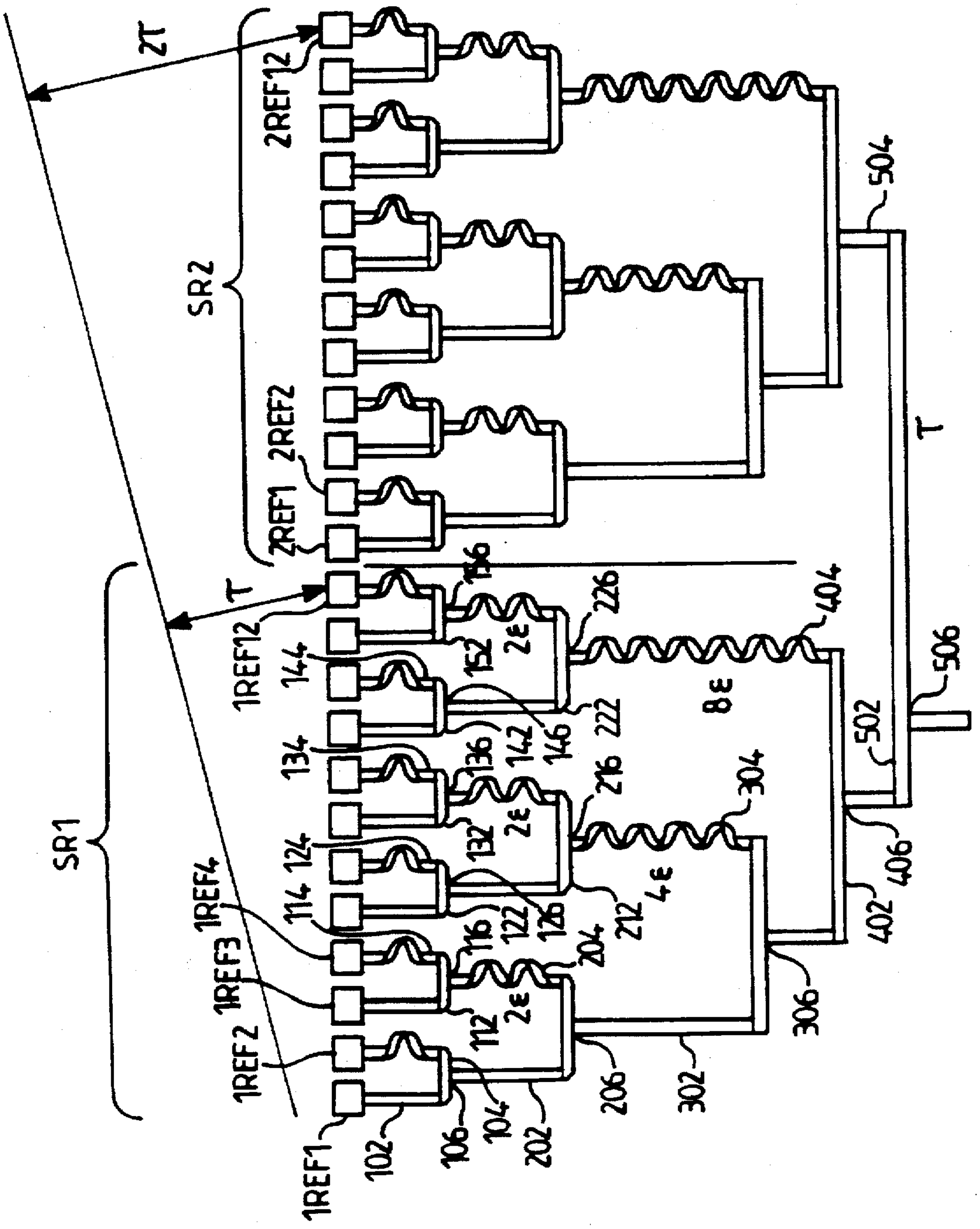
FIG. 13 is a representation of the distribution of the reference radiating elements according to the invention.

FIG. 13 shows the equivalent circuit diagram of the distribution of the reference radiating elements according to an inverse partially binary treeing. That distribution brings about the delays in the propagation of the waves thus picked up by the reference radiating elements.

The representation covers two sub-networks SR1 and SR2 each having 12 reference radiating elements (1REF1 to 1REF12 in the case of sub-network SR1 and 2REF1 to 2REF12 in the case of sub-network SR2).

The representation applies generally to the eight sub-networks of which, for example, a linear network or block according to the invention consists.

The reference FO denotes the time-lag law applied to the reference radiating elements of the sub-networks SR1 and SR2 for picking up the incident waves in a selected direction.

Electrical time-lags are provided to ensure that stability is imparted to the direction of the beam in the horizontal plane regardless of the reception frequency. In practice, the electrical time-lags are provided by means of micro-ribbon supply lines connecting the different reference radiating elements in accordance with an inverse partially binary treeing.

To be more precise, the reference element 1REF1 is connected to the reference element 1REF2 by an arrangement of micro-ribbon lines comprising:

- a line 102 of selected length having a first end connected to the reference element 1REF1 and a second end connected to the node 106; and
- a line 104 having a length that is different from that of the line 102 and having a first end connected to the reference element 1REF2 and a second end connected to the node 106. The difference in length between the lines 102 and 104 defines an equivalent electrical time-lag $\epsilon$.

The other reference elements are connected in pairs in the same manner as that described above.

The pairs of reference elements thus formed are then connected two-by-two in accordance with an arrangement which is similar to that described above and from which it differs only in the difference in length between the lines. For example, the lines 202 and 204 connecting the pair of elements 1REF1, 1REF2 to the pair of elements 1REF3, 1REF4 have a difference in length of 2 $\epsilon$.

In addition, the lines 302 and 304 enable the elements 1REF1 to 1REF4 to be connected to the elements 1REF5 to 1REF8. The difference in length between the lines 302 and 304 corresponds to an electrical time-lag equivalent to 4 $\epsilon$.

Likewise, the lines 402 and 404 connect the elements 1REF1 to 1REF8 to the elements 1REF9 to 1REF12. The difference in length between the lines 402 and 404 corresponds to an electrical time-lag equivalent to 8 $\epsilon$.

Finally, the lines 502 and 504 connect the elements of the sub-network SR1 to the elements of the sub-network SR2. The difference in length between the lines 502 and 504 corresponds to an electrical time-lag of $\tau$ where $\tau$=11 $\epsilon$.

In practice (FIG. 14), an amplifier AMPV1 is associated with the sub-network SR1. This amplifier is of the low-noise type having a gain of the order of 20 db with an intrinsic noise factor of the order of 1.5 db. For example, it is produced by HEMT technology ("High Electron Mobility Transistor").

Associated with each amplifier AMPV is a respective sub-network SR, each of which comprises 12 reference radiating elements REF1 to REF12.

For example, a linear network comprises approximately 96 reference radiating elements of the bipolarisation type arranged in eight sub-networks each comprising twelve elements.

The eight amplifiers AMPV are connected to a low-noise amplifier (not shown) which is connected to a mixer (not shown), permitting a frequency transposition with an intermediate frequency of from 1 to 2 GHz.

Figure 14:
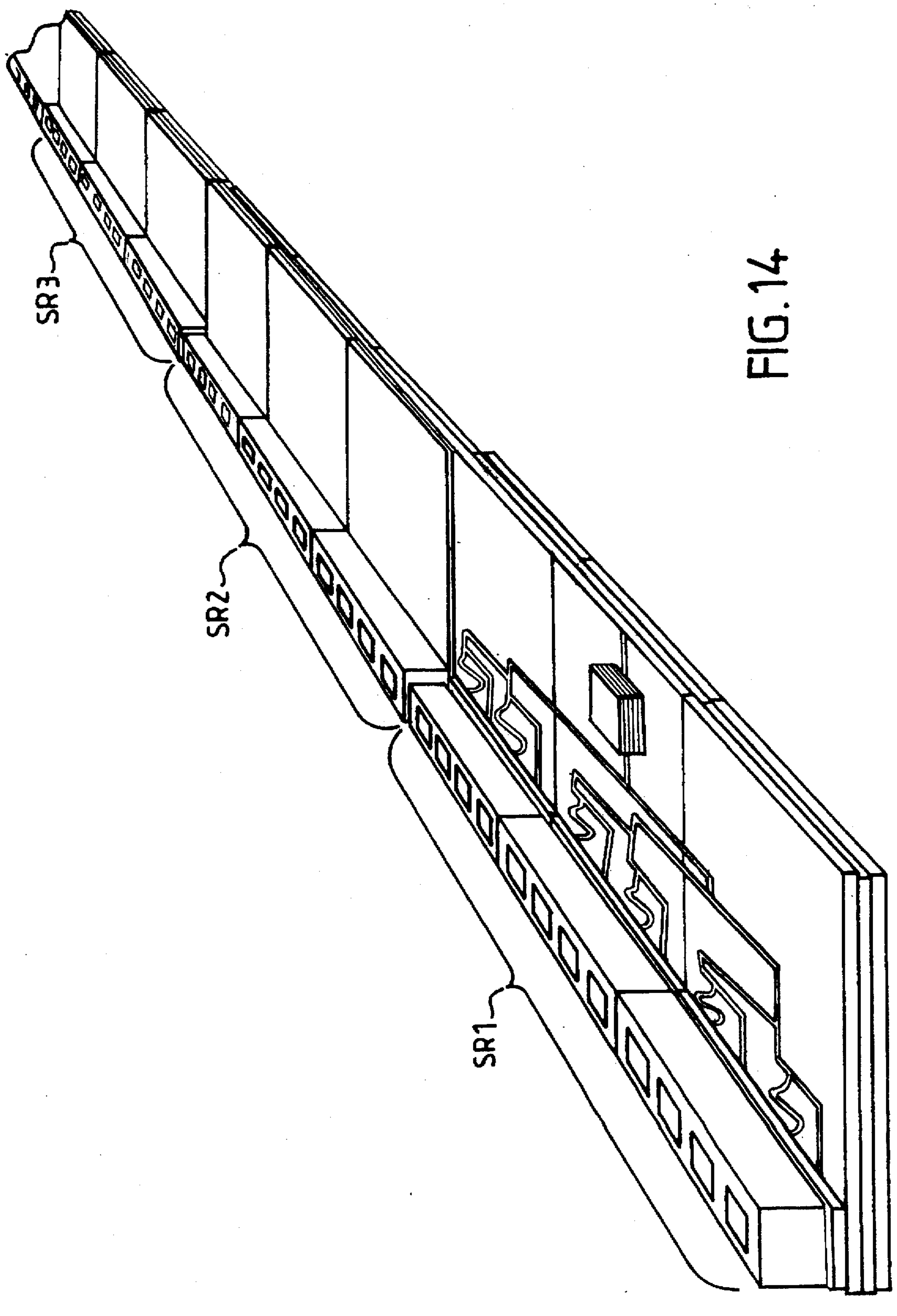
FIG. 14 is a view illustrating the assembly of the sub-networks to form a linear network according to the invention.
Figure 15:
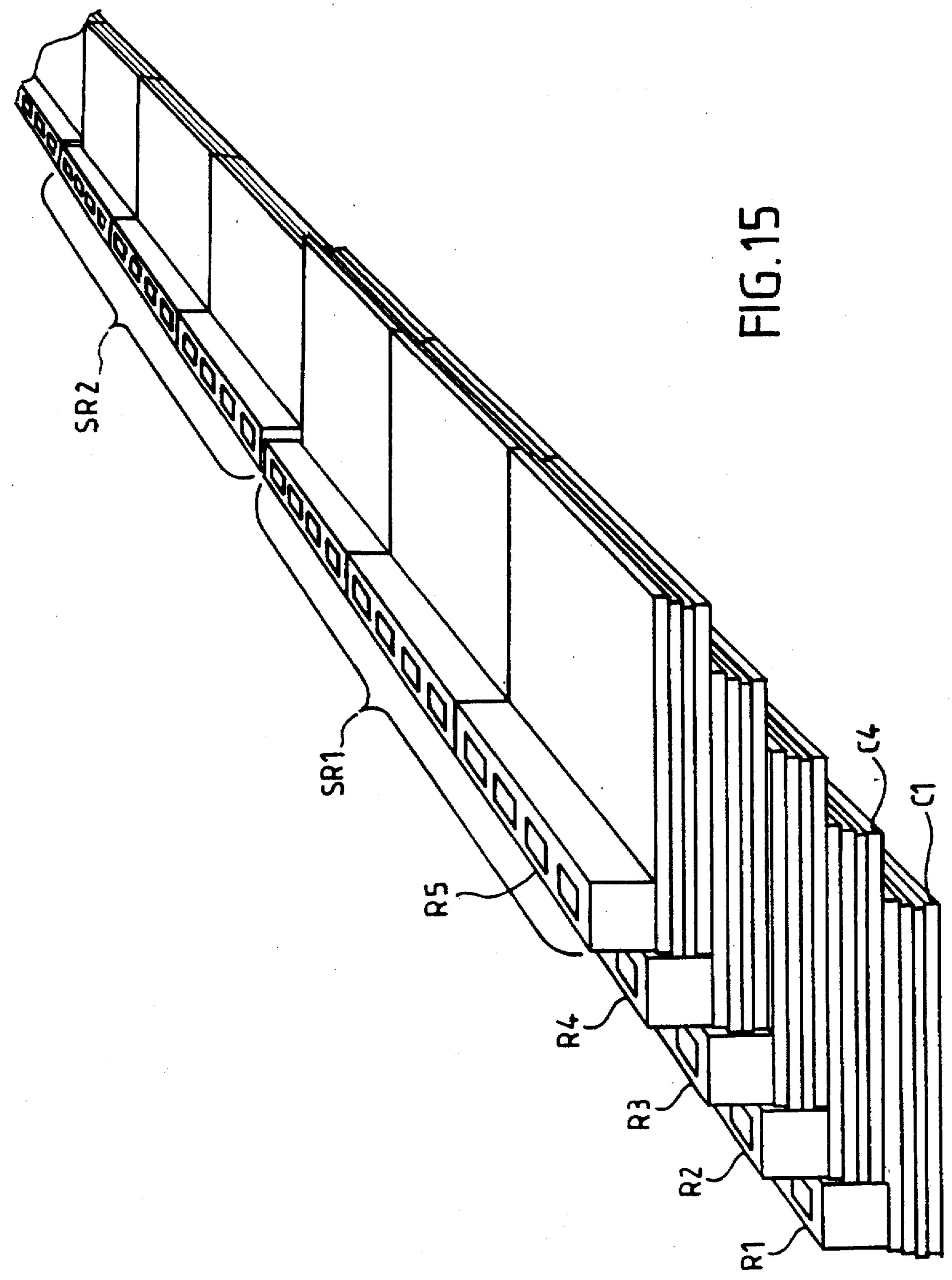
FIG. 15 is a view illustrating the assembly of the linear networks to form a source according to the invention.

With reference to FIG. 15, it can be seen that the linear networks R1 to R5, each of which is made up of the sub-networks SR1, SR2 described with reference to FIGS. 13 and 14, are non-coplanar horizontally. This non-coplanarity is attributable to the mounting of the linear networks in tiers or layers. Thus, layer C4 of network R2 is arranged on layer C1 of network R1.

The networks process, in accordance with the respective laws of amplitude and time-lag, the incident microwaves emanating from the different directions corresponding to the different satellites to be picked up.

Advantageously, the respective laws of amplitude are set up so as to avoid reception interference between the different satellites. Preferably, these laws of amplitude are of the CHEBYSHEV type. They are in this case formed by the energy distributors DIV, LIH and LIV described above.

These laws permit the weighting of the amplitude along the horizontal axis of the linear networks in order to reduce the level of the side lobes to a threshold such that interference phenomena between satellites are avoided.

It should be remembered that the time-lag laws FO are in this case provided by means of the micro-ribbon supply lines LPH, LPV described above.

Such provision ensures that, for each network, stability is imparted to the direction of a beam in the horizontal plane regardless of the reception frequency of the satellite.

Thus, according to the invention, a given linear network is allocated to a given satellite. The linear network comprises a pair of linear networks of band spreading pick-up and reference elements which are coupled radioelectrically, and of which the electrical time-lags are determined by construction for the reception of the said satellite.

In practice, the linear networks are arranged in a removable manner and are interchangeable. They can be installed in an open-ended manner, that is to say, the antenna is capable of functioning equally well regardless of the number of networks. For example, a user may start his installation with three networks. Then, he may complete his initial installation with other networks.

This is a major advantage for the user who can thus acquire a versatile system where he chooses completely freely the number of networks each adapted to the reception of a selected satellite.

In practice, the assembly made up of the networks installed on the carrying structure has a radiation diagram of which the angular dynamics are, in terms of bearing, of the order of ±40° and, in terms of elevation angle, of the order of ±5°.

The Applicant has obtained for a satellite transmission frequency of the order of 12.75 GHz, a beam capable of covering an orbital space of 0.9° width in the axis, of 1.20° width at a bearing of 40°, and of 2° width with amplitude weighting.

Under those conditions, the angular dynamics of a bearing of ±40° can be covered by a set of 15 separate networks (by reverse symmetry the dynamics are reduced to 40°), each network being assumed to have a variation of approximately from 1.20° to 1.50° in width (bearing). As a result, the user chooses from this set of 15 networks those which enable him to pick up the desired satellites.

Figure 16:
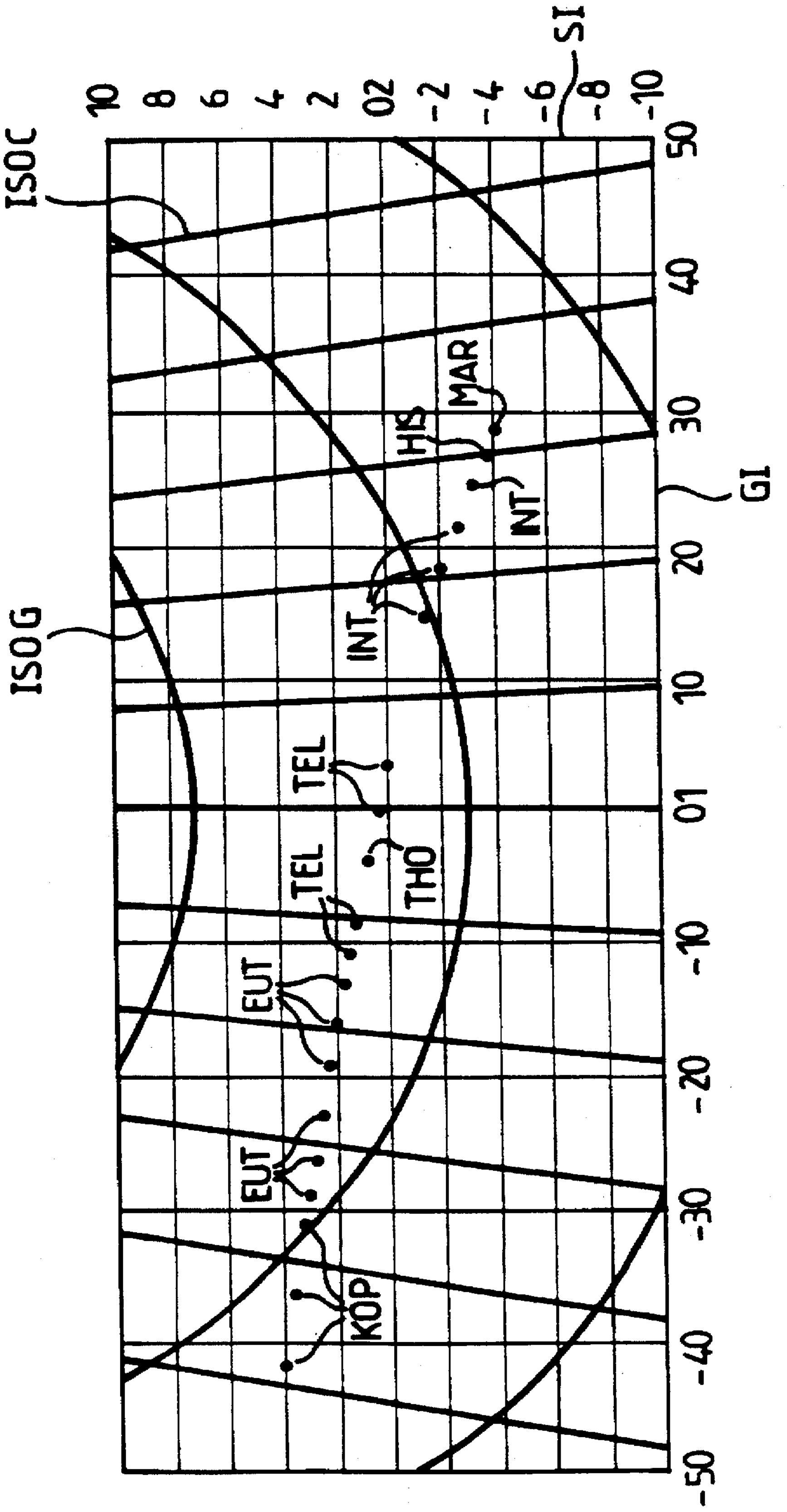
FIG. 16 is a diagram showing the constellation of the satellites seen in Paris.

FIG. 16 shows a diagram of the constellation of the satellites over Paris, with an antenna positioned in accordance with the following spherical coordinates: 190° for the course and 32.8° for the elevation.

It can be seen that, in Paris, the satellites are distributed along a portion of a curve. The following satellites in particular can be seen: KOP for KOPERNIKUS, EUT for EUTELSAT, THO for THOR, TEL for TELECOM, INT for INTELSAT, HIS for HISPASAT and MAR for MARCO-POLO.

Surprisingly, the Applicant has observed that the change in the reference frame between spherical coordinates (course and elevation) and elevation angle and bearing coordinates advantageously enables a set of linear networks to be chosen in order to pick up the desired satellites.

Thus, in order to pick up the KOPERNIKUS satellite in Paris, it is advantageous to use a linear network capable of producing a radiation diagram the bearing of which is off-target by the order of −40° and the elevation angle of which is off-target by the order of +3°.

Very advantageously, a user who also wishes to pick up the EUTELSAT satellite in Paris chooses a linear network which has a radiation diagram of which, by construction, the bearing is off-target by the order of −25° and the elevation angle is off-target by the order of +2°.

The invention relates also to a method of installing a multi-beam antenna at a given site. According to the invention, the method comprises the following stages:

a) providing a set of several linear networks, each having a radiation diagram with a predetermined bearing;

b) collecting first-level information relating to the latitude and longitude of the site, according to the number of satellites to be received, at the minimum angle of phase difference between the selected satellites, and at the maximum angular dynamics corresponding to the selected satellites;

c) calculating second-level information relating to the nominal course and elevation positioning of the antenna from the first-level information thus collected;

d) orienting the course and elevation of the reflector of the antenna on the basis of the second-level information thus calculated;

e) selecting from the set of networks that of which the radiation diagram is adapted to that of the selected satellites as a function of the first-level information thus collected; and f) installing the linear networks so selected on the support substantially at the level of the focal straight line, in accordance with an order determined as a function of the first-level information thus collected.

I claim:

1. An antenna for receiving microwaves emanating from at least first and second satellites comprising:

a reflector which has a cylindro-paraboloidal shape (2) and is arranged substantially in the vertical plane and is capable of focusing the incident microwaves on a substantially horizontal focal straight line (D) constructed from the foci (F1 to F5) of the said reflector;

at least first and second linear networks of receiving elements, said linear networks (R1, R2) being distributed substantially horizontally in the focal plane of said reflector, in order to receive the incident microwaves emanating from first and second directions corresponding to first and second satellites, and to process the incident microwaves according to first and second laws of amplitude and time-lag, each of said linear networks including:

a first focusing radiator layer (C1) adapted for focusing the incident microwaves, comprising a plurality of focusing radiating elements arranged in a line;

a second pass-band spreading radiating layer (C2) comprising a plurality of band spreading radiating elements arranged in a line opposite the focusing elements;

a third reference radiating layer (C3) comprising a plurality of reference radiating elements arranged in a line opposite the band spreading radiating elements and coupled to the latter for the microwave reception of a satellite; and a fourth layer (C4) for processing the microwave signals so received.

2. The antenna according to claim 1, wherein each linear network is produced by printed technology.

3. The antenna according to claim 1, wherein the reference radiating elements are circular or rectangular tiles supplied at two different points, with adaptation of the energy distribution.

4. The antenna according to claim 3, wherein the reference radiating elements are supplied in accordance with an inverse partially binary treeing.

5. The antenna according to claim 4, wherein each linear network of reference radiating elements is sub-divided into a plurality of sub-networks (SR1, SR2) each comprising an amplifier (AMPV1, AMPV2), the respective amplifiers of the sub-networks (SR1, SR2) being connected to a network amplifier.

6. The antenna according to claim 4, wherein the reference radiating elements are produced by triple-sheet technology.

7. Antenna according to claim 1, characterised in that the first and second linear networks (R1, R2) are non-coplanar and are arranged substantially at the level of the focal straight line (D) of the said reflector.

8. An antenna for receiving microwaves emanating from at least first and second satellites, comprising:

a reflector which has a cylindro-paraboloidal shape (2) and is arranged substantially in the vertical plane and is capable of focusing the incident microwaves on a substantially horizontal focal straight line (D) constructed from the foci (F1 to F5) of said reflector;

at least first and second linear networks of receiving elements, the said linear networks (R1, R2) being distributed substantially horizontally in the focal plane of said reflector, in order to receive and process, according to first and second laws of amplitude and time-lag, the incident microwaves emanating from first and second directions corresponding to first and second satellites, and wherein each of the first and second linear networks (R1, R2) are non-coplanar and are arranged substantially at the level of the focal straight line (D) of the reflector.

9. The antenna according to claim 7, wherein the first and second laws of amplitude are set up in such a manner as to avoid reception interference between the first and second satellites.

10. The antenna according to claim 9, wherein the first and second laws of amplitude are of the CHEBYSHEV type.

11. The antenna according to claim 7, wherein each linear network has a radiation diagram, of which the angular aperture at half-power is, in terms of elevation angle, of the order of ±30°, and in terms of bearing, of the order of 1.2°.

12. The antenna according to claim 7, wherein the first and second time-lag laws are set up in accordance with a linear or quadratic progression.

13. The antenna according to claim 7, wherein the reflector is substantially inclined by a predetermined angle in the vertical plane in order to offset the first and second linear networks in relation to the center of the reflector.

14. The antenna according to claim 8, including a carrying structure of the cradle type capable of supporting the first and second linear networks.

15. The antenna according to claim 14, wherein the carrying structure also supports the reflector.

16. The antenna according to claim 8, wherein the length of the reflector is of the order of from 1.80 to 2.50 m and the height of the reflector is of the order of 1.10 m.

17. The antenna according to claim 16, wherein the length and the height of the first and second linear networks are of the order of 1.50 m and 20 mm, respectively.

18. The antenna according to claim 8, wherein the linear networks are supported by a carrying structure in an open-ended manner, the antenna functioning equally well regardless of the number of linear networks.

19. The antenna according to claim 18, wherein the angular dynamics of a source made up of linear networks (R1, R2) mounted on the carrying structure are, in terms of bearing, of the order of ±40° and, in terms of elevation angle, of the order of ±5°.

20. A method of installing a multi-beam antenna at a selected site, including the following steps:

a) collecting first-level information relating to the latitude and longitude of the selected site, according to the number of satellites to be received, at the minimum angle of phase difference between the selected satellites, and at the maximum angular dynamics corresponding to the selected satellites;

b) calculating second-level information relating to the nominal course and elevation positioning of the antenna from the first-level information thus collected;

c) providing a set of several linear networks, each having a radiation diagram of predetermined bearing;

d) selecting from the set of linear networks that of which the radiation diagram is adapted to that of the selected satellites as a function of the first-level information thus collected;

e) orienting the course and elevation of the reflector of the antenna on the basis of the second-level information thus calculated; and f) installing the selected linear networks on a support substantially at the level of the reflector focal straight line, in accordance with an order determined as a function of the first-level information thus collected.

* * * * *